US010210361B1

(12) United States Patent
Catoe

(10) Patent No.: US 10,210,361 B1
(45) Date of Patent: Feb. 19, 2019

(54) SYSTEMS AND METHODS FOR CHECKOUTS, SCAN PORTAL, AND PAY STATION ENVIRONMENTS WITH IMPROVED ATTENDANT WORK STATIONS

(71) Applicant: ECR SOFTWARE CORPORATION, Boone, NC (US)

(72) Inventor: Peter Terry Catoe, Blowing Rock, NC (US)

(73) Assignee: ECR Software Corporation, Boone, NC (US)

(*) Notice: Subject to any disclaimer, the term of this patent is extended or adjusted under 35 U.S.C. 154(b) by 0 days.

(21) Appl. No.: 14/835,145

(22) Filed: Aug. 25, 2015

Related U.S. Application Data

(60) Provisional application No. 62/041,239, filed on Aug. 25, 2014.

(51) Int. Cl.
*G06K 15/00* (2006.01)
*G06K 7/10* (2006.01)

(52) U.S. Cl.
CPC .................................. *G06K 7/10594* (2013.01)

(58) Field of Classification Search
CPC .... G07G 1/0036; G07G 1/0045; G06Q 20/20; G06Q 20/201
USPC ................................................ 235/383, 385
See application file for complete search history.

(56) References Cited

U.S. PATENT DOCUMENTS 4,792,018 A * 12/1988 Humble ............... G07G 1/0054 235/383
5,679,941 A * 10/1997 Iizaka ....................... A47F 9/04 235/383
7,246,745 B2 7/2007 Hudnut et al. ................ 235/383
7,337,960 B2 3/2008 Ostrowski et al. ........... 235/383
7,387,241 B2 7/2008 Hassenbuerger ............. 235/383
7,909,248 B1 3/2011 Goncalves .................... 235/383
8,459,558 B2 6/2013 Baitz ............................ 235/470
8,556,181 B2 10/2013 Twiste .......................... 235/470
2004/0083170 A1 4/2004 Bam et al. ...................... 705/40
2006/0131402 A1* 6/2006 Crockett ................ G06Q 20/20 235/383
2006/0183943 A1 8/2006 Hu ..................................... 564/1
2006/0283943 A1 12/2006 Ostrowski et al. ........... 235/383
2008/0110724 A1 5/2008 Twiste .......................... 198/620
(Continued)

FOREIGN PATENT DOCUMENTS

EP 0 663643 6/2000 ............... G06K 7/10

*Primary Examiner* — Daniel St Cyr
(74) *Attorney, Agent, or Firm* — MacCord Mason PLLC

(57) ABSTRACT

A checkout counter includes a support surface for a standing person to place and remove items. A powered conveyor transports placed items in a direction from a first end of the conveyor toward an opposite end. The conveyor has a discharge end, and part of the support surface extends toward the opposite end beyond the conveyor. An upward-oriented bar code scanner in the support surface reads bar codes as an attendant passes them over the scanner. At least one bag mount extends laterally from the support surface and the support surface define an attendant cockpit located laterally of the checkout counter near the discharge end, allowing an attendant to stand in the cockpit facing the counter at a substantially right angle. The attendant can handle items discharged from the conveyor, pass them over the scanner, and place them in a bag without having to twist or turn his or her body.

24 Claims, 12 Drawing Sheets

(56) References Cited

U.S. PATENT DOCUMENTS

| | | | | |
|---|---|---|---|---|
| 2009/0039164 | A1 | 2/2009 | Herwig et al. | 235/462.41 |
| 2009/0134221 | A1* | 5/2009 | Zhu | A47F 9/046 235/383 |
| 2012/0105448 | A1 | 5/2012 | Kim | 345/419 |
| 2012/0187194 | A1 | 7/2012 | Svetal et al. | 235/470 |
| 2012/0187195 | A1 | 7/2012 | Actis et al. | 235/479 |
| 2012/0205448 | A1 | 8/2012 | Hoskinson et al. | 235/440 |

* cited by examiner

SYSTEMS AND METHODS FOR CHECKOUTS, SCAN PORTAL, AND PAY STATION ENVIRONMENTS WITH IMPROVED ATTENDANT WORK STATIONS

BACKGROUND

The present invention relates generally to self-checkouts, checkouts, scan portals and pay station environments, and more particularly to improved systems and methods for arranged attendant work stations.

In a retail type environment, the efficiency with which consumers are able to process, pay for and purchase their desired items factors into the expenses for a retail type establishment. The labor hours attributable to manning checkout counters contribute greatly to this expense. Therefore, quickly processing transactions with minimal attendants needed at open checkouts, resulting in high throughput at the checkout, increases productivity and helps manage such overhead expenses.

Efforts to improve the traditional checkout, self-checkout, and hybrid checkout scenarios are being created, where technologies such as scan tunnels and paystations create a checkout that is not the traditional fully attended checkout and is not the unattended checkout. Scan tunnel technology has been introduced that allows the consumer to place the items to be purchased on a conveyor belt. The conveyor belt carries the items through a scan tunnel that automatically scans the items, relieving the consumer and/or attendant of this responsibility. Consumers no longer need to scan each item and attendants are freed up to assist with bagging the purchased items and attending to exceptions occurring during the checkout process. While attendants in this scenario no longer have to scan each of the items, they are faced with processing a transaction at a much quicker pace and must efficiently scan exception items that did not enter the transaction correctly, interact with a display chronicling the transaction and bag the items.

In one example, centralized pay stations allow consumers to swiftly move through a transaction at a checkout and then for several checkout stations to be serviced by one pay station. One attendant can manage the pay station, freeing other attendants to focus on bagging and exception scanning and handling. While these advancements in checkout stations increase speed and throughput, Applicant foresees that other challenges are being created or intensified by the developing check-out environments, such as the hybrid checkout stations.

Attendant's responsibilities in scan tunnel (also known as "portal scanner") scenarios involve two major functions: 1) bagging items and 2) handling exceptions. These functions will occur rapidly and in higher volume during most transactions than previously experienced with more traditional checkouts and hybrid self-checkouts. Traditionally, brick-and-mortar retail transactions do not require front-end store employees to multi-task with the speed and in the manner described above for the scan tunnel scenario. The hybrid checkout places both the consumer and attendant into new roles at the checkout. One consistent factor though in all checkouts is that the attendant is faced with bagging and scanning responsibilities in some fashion. The focus in developing checkouts is on transaction efficiency, more advanced checkouts that process a portion of the transaction, and the speed with which attendants assist customers to keep a quicker customer flow through at the checkouts.

While the checkout stands are advancing for quicker checkout and efficiency, much less attention is given to the repetitive motions required of the attendants or the increased demand placed on attendants as they focus more on the same types of movements in often very uncomfortable and awkward positions. Even when the ergonomics of the checkout stand are considered, they are often skewed toward one body type that may make movements even more uncomfortable for other body-types, for example, shorter reach, taller height, and/or males and females. Applicant's inventions address these and other challenges in the art and are directed to a new method and system for improving the attendant work station at checkout terminals, for example, traditional checkout and hybrid checkout terminals.

Other developing systems have a scanner placed at a 90-degree or right angle in relation to the conveyor belt's direction of transport consistent with many traditional checkout systems. This means that attendants for those systems are forced to move in a more mechanical and unnatural way. In addition, they must move around in a significantly larger area, because reach requirements are greater with a scanner/scale that is in a right-angle position.

SUMMARY

Accordingly, one aspect of the invention is to provide an ergonomic checkout counter including a checkout station, a point-of-sale system having a microprocessor and memory operatively associated with one another, and an attendant work station. The system may further include a portal scanner.

In another example, the invention includes a checkout apparatus including a base with a customer interface, a scan tunnel and an attendant work station with an attendant interface. The customer interface and attendant interface are spaced apart by the scan tunnel. Also included is a transport mechanism extending from the customer interface, through the scan tunnel and to the attendant interface so that a customer may load items for purchase on the base at the customer interface. The transport mechanism transports the loaded items through the scan tunnel to the attendant interface. The scan tunnel is equipped with transducers to read information about the loaded items as they pass through the scan tunnel and deliver digital electronic signals indicating the read information to assist in compiling a digital list of items the customer has chosen to purchase.

Further included may be a defined location for the attendant (attendant work station "AWS") which may include, by way of example, the attendant interface, a bagging station, a scanning station. The attendant interface may include an attendant display. The attendant interface may also be in communication with a digital attendant identification file including information about the attendant, for example, the attendants' arm-reach, height, etc. The area of the attendant interface may be defined, at least in part, by the extent of the attendant's arm-reach. While each attendant may have various minimum and maximum ergonomic values, such as height and arm-reach, applicant realized that there is typically an overlap area between the values for each individual and if the attendant work station was structurally arranged properly, then those values could be used to design a more ergonomically friendly attendant work station to a larger number of users. A more ergonomically friendly work station will result in enhancing the abilities of more attendants to work efficiently at increased speeds and with increased demands and to avoid repetitive motion injuries, especially those from being placed in awkward positioning with unnatural movements for long periods of time.

Most scanners have a particular angle at which the scanning of items is most reliable, even so-called omni-directional scanners. Generally, that particular angle is perpendicular to one of the sides of the rectangular face of the scanner. Passing the item to be scanned across the scanner at the particular angle maximizes the likelihood that the bar code will be read accurately. While the scanners can read bar codes when scanned at different angles, as the scanning angle deviates more from the particular angle, the likelihood of a successful accurate read becomes lower. Typically scanners provide a feedback signal, such as an audible beep, notifying the users of a successful scan. If the bar code cannot be read when scanned, then the item must be scanned again, causing more work for the person doing the scanning, reducing efficiency, and increasing customer wait times.

The invention may be considered a checkout counter including a support surface at a height convenient for a standing person to place and remove items. The support surface includes a powered conveyor to transport placed items in a direction from a first end of the conveyor toward an opposite end such that the conveyor has a discharge end, with a span of support surface extending toward the opposite end beyond the conveyor. An upward-oriented bar code scanner in the support surface reads bar codes of items passed over the bar code scanner by an attendant. Bag mounts extend laterally from the support surface to hold open bags for receipt of items placed in the bags by an attendant. The bag mounts define an attendant cockpit located laterally of the checkout counter conveyor adjacent the discharge end. The attendant can stand in the cockpit laterally of the checkout counter and face the counter at a substantially right angle as the attendant handles items discharged from the conveyor, passes the items over the bar code scanner, and places them in a bag held open on a bag mount.

An additional bar code scan tunnel may straddle the conveyor between the first end and the discharge end.

Typically, the bar code reader more reliably reads bar codes of items when scanned in a particular direction over the bar code reader. Preferably, the bar code reader is mounted in the support surface with the particular direction at an oblique angle to the direction that the powered conveyor transports placed items. A bar code reader may be atop the support surface. The oblique angle may be about 20 to 50 degrees to the direction that the powered conveyor transports placed items, or more preferably 30 to 40 degrees to the direction that the powered conveyor transports placed items.

A display panel may be mounted on and spaced above the support surface, spaced from the discharge end and across the support surface from the cockpit. The panel may be mounted on an adjustable hinge, so an attendant may move the display panel as it remains mounted above the support surface.

In one example, the cockpit is located at an exception pick-up area associated with the checkout station.

The invention can also be considered as a method of attending customers at a checkout counter. The method includes, while at a stance at a cockpit adjacent a support surface and facing the support surface: retrieving items discharging from a powered conveyor on the support surface that has transported the items in linear direction, scanning retrieved items over an upward-oriented bar code scanner in the support surface to read bar codes of items as they are passed over the bar code scanner, and placing scanned items in bags mounted in bag mounts extending laterally from the support surface.

The steps of retrieving, scanning and placing for multiple items are conveniently performed without moving from the stance at the cockpit facing the support surface.

The method may include looking at a display panel mounted on and spaced above the support surface. The method may be performed at a cockpit located at an exception pick-up area associated with the checkout station.

Preferably, the stance includes standing with feet aligned in a line substantially parallel with the linear direction of the conveyor.

BRIEF DESCRIPTION OF THE FIGURES

These and other aspects of the present invention will become apparent to those skilled in the art after a reading of the following description of the preferred embodiment when considered with the drawings.

DESCRIPTION OF THE PREFERRED EMBODIMENTS

Figure 1:
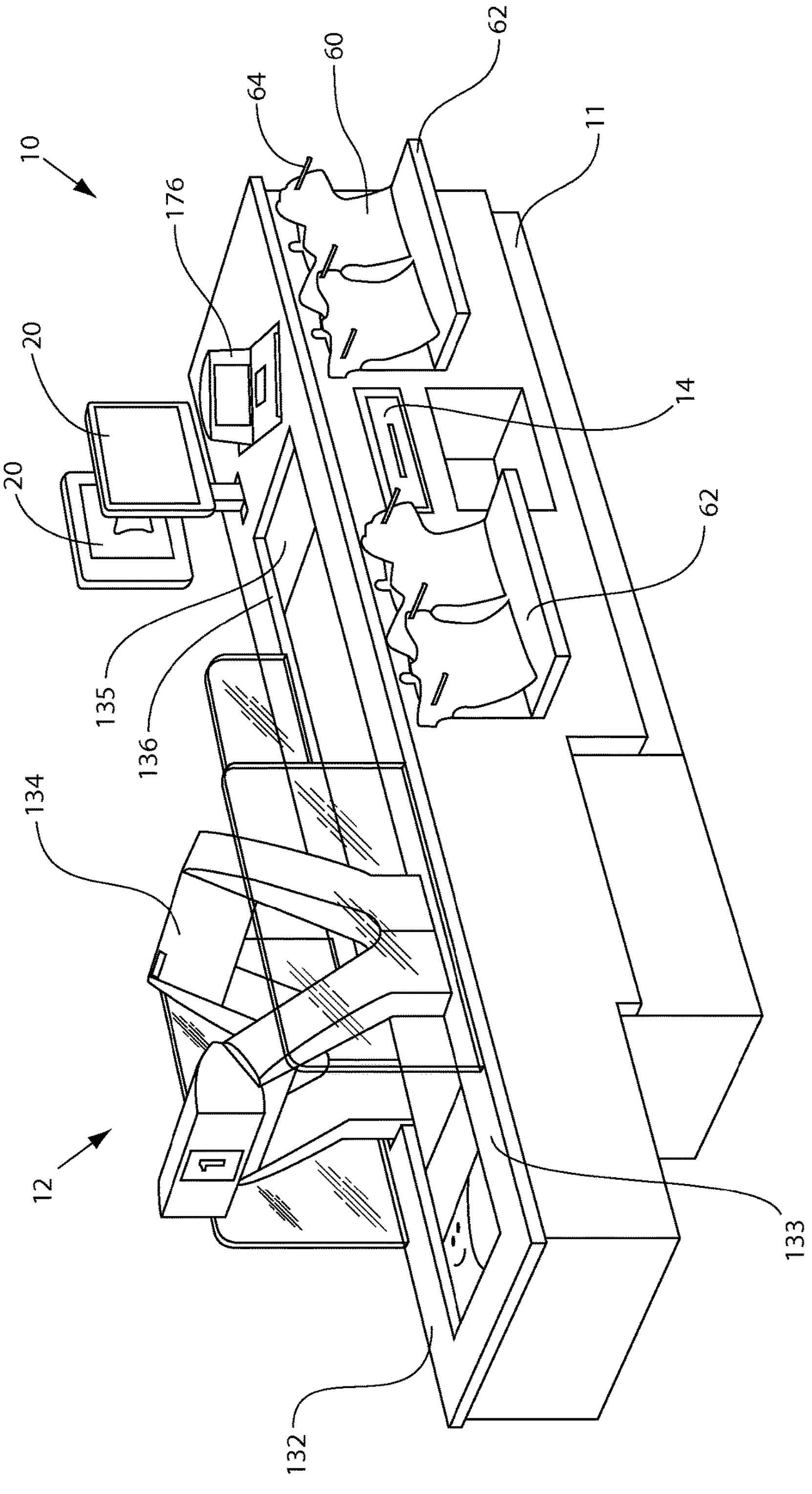
FIG. 1 is a perspective view of one example of a checkout counter without users.

Many checkouts and checkout counters are known in the art. FIG. 1, generally shows one example of a checkout counter 10. More conventional checkout counters are also considered within the scope of this invention. The checkout counters usually include a housing 11, which accommodates or houses the other aspects of the checkout counter. The housing 11 may be a pre-existing structure at the installation site of the checkout counter, may resemble the housing as shown in FIG. 1, or may take on other shapes able to accommodate the other aspects of the invention.

The checkout may also include input modules, output modules and transaction modules. The input module may be, for example, a coupon-in center, credit/debit card reader, or a payment center. The input module may typically be supported on, integral to, or attached to the housing 11. A bar code scanner would be another example of an input module suitably found in the checkout. Other examples, inter alia, may include one or more keypads to key in information, RFID reader, a microphone (potentially with voice recognition software), a touch screen keypad, a video camera, tablet computer, wireless communication receiver, a credit card reader, a debit card reader, a smart card reader, a loyalty card scanner, a cash receiver, a wireless transmission router, a mobile phone, and/or any of these in combination.

Output module 14 may include a coin-out center, a cash-out center and/or a receipt center. Display screen 20 may provide instructions to the attendant or provide feedback from input received through input module. For example, the identification and recorded price of scanned items may be displayed on display 20. A preferred display is a panel PC, requiring no additional adjacent hardware tower, but connected by cabling or wirelessly to a network. The preferred display 20 is a panel pc supported on a pole by an adjustable hinge, so the user may move the display. In the case of a touch screen display, the display serves as both a part of the input module and output module 14. A speaker (not shown) may also serve to provide audio information to the attendant and/or consumers. Other examples of output module species may include a private printing page, a link transmitting to a handheld device such as a mobile phone or tablet computer or the like.

As seen in FIG. 1, two bag mounts 60 are mounted cantilevered from the housing 11. The bag mounts 60 shown in FIG. 1 include a support shelf 62 and a bag rack 64, conventionally used for holding open T-shirt bags in self-checkout systems. The bag mount shown in FIG. 2 uses only a shelf 62, supporting self-opening bags. Both types of bag mounts may be used, or the bag rack 64 can be made retractable, allowing the same bag support to be used either way. The bag mounts are spaced from one another, defining a cockpit 63 for the attendant to stand in adjacent the housing 11, within convenient reach of items A coming off the conveyor 133, the scanner/scale 176 and the display 20. Alternatively, one bag mount 60 may be used. In other examples the cockpit may be defined on one side by shelf 62 or bag mounts 60.

Figure 7:
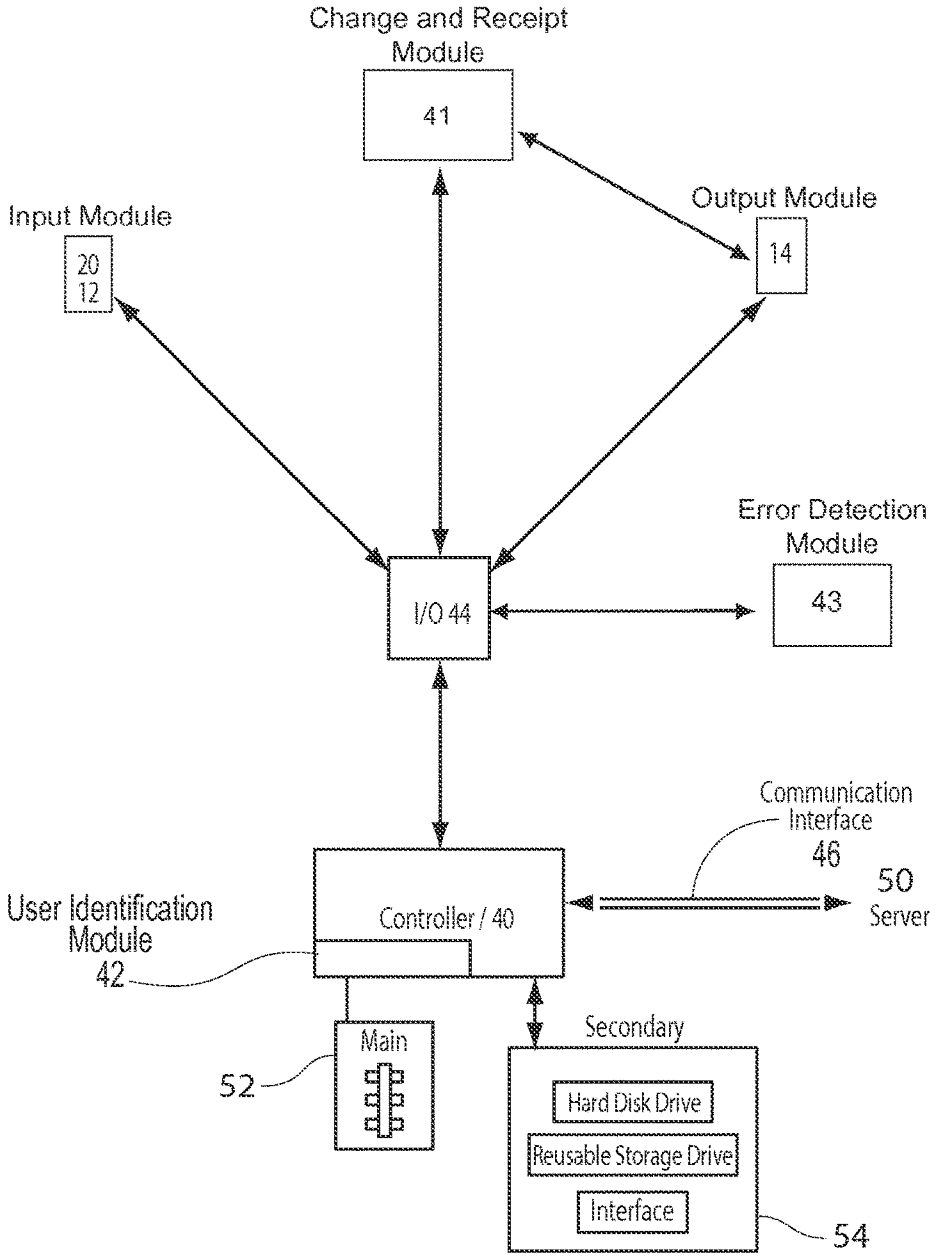
FIG. 7 is a flow chart illustration of one example of the controller and input and output systems of the checkout.

A checkout counter may further include a POS computer system typically connected on a network in a retail store and potentially beyond. The POS computer system may include a controller 40 (as shown in FIG. 7), operatively connected to the input module and output module. The controller has POS programming arranged to process information from the input module 12, such as the items being purchased in the transaction, and to provide information through output module 14 to the customer to allow completion of a customer transaction through system 10.

A controller 40, such as a microprocessor, may be, for example, in the checkout or store database computer, and usually includes an associated memory. The controller 40 connects through input/output ports 44 in order to receive information from and to provide information to the modules included in the checkout. By way of example, the controller receives information from the input module 12 and provides data to the output module 14. The controller may have a clock component so that elapsed time between events can be determined. Other configurations of times can be used.

Shown in FIG. 7, the POS computer system may include a main memory 52 or a secondary memory 54, or both, which may communicate with the controller. The main memory is generally a random access memory (RAM) that may include an item buffer for temporarily holding identification information corresponding to scanned items before the items are verified. On the other hand, the secondary memory with standard input/output ports may include any storage medium such as but not limited to a hard disk drive, a SCSI drive, a removable storage drive or removable storage units and interface. Alternatively, the secondary memory may include handheld computing devices, as well as one or more databases such as a look-up database that includes SKU number, price, item codes, tolerance range for the item or for a class of items, and corresponding weight, height, length, or width for each item in the store. This database may reside on one or more of different or additional computers such as at a central store server 50 or a remote server outside of the location.

Additionally, the controller may communicate with the secondary memory 54 which may be a remote server, for example, accessed via local area network or global networking such as the Internet or Intranet, and refresh a display screen with information and software stored in the remote server.

Figure 8:
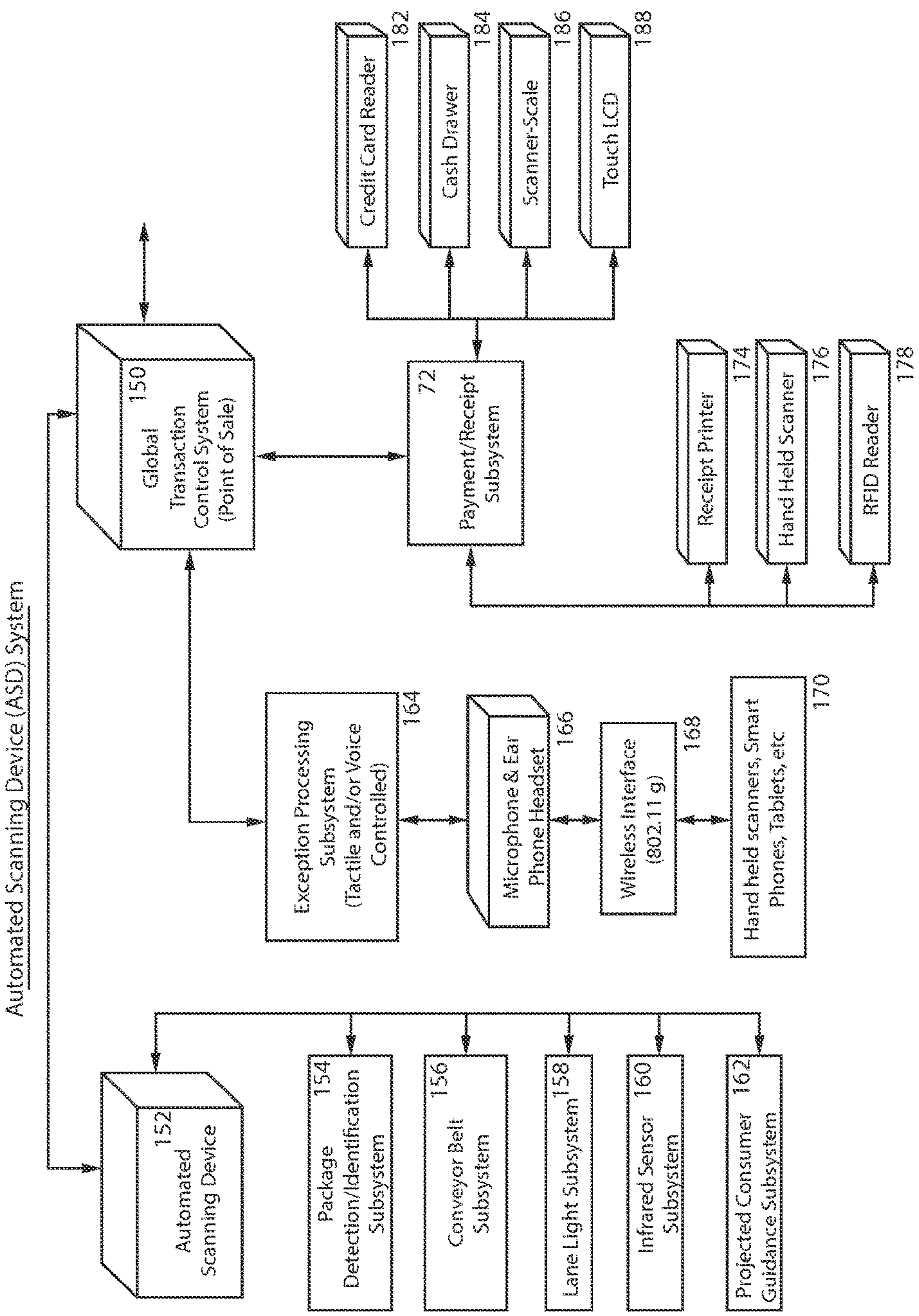
FIG. 8 is a block illustration of one example of a hybrid checkout including an automatic scanning device.
Figure 9:
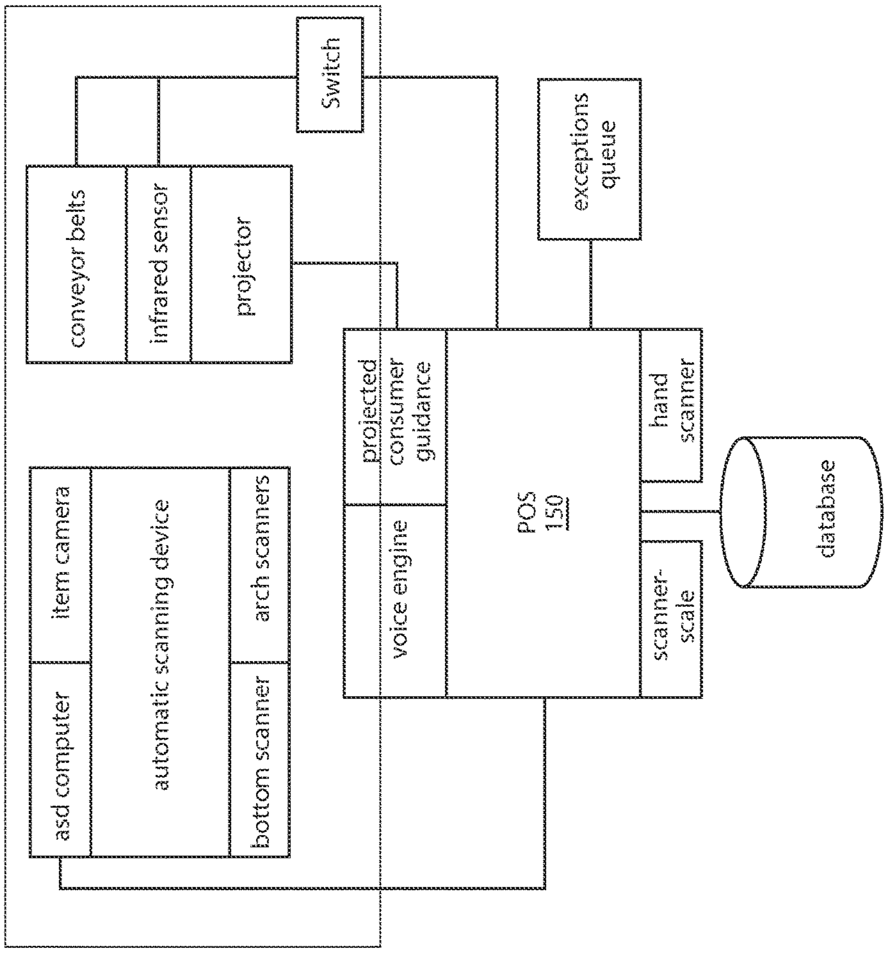
FIG. 9 is a block illustration of another example of a hybrid checkout including an automatic scanning device.

FIGS. 8 and 9 are block graphic representations of an example of an improved hybrid checkout counter, including an automatic scanning device. In this example, the hybrid checkout counter includes a global transaction control system 150 in communication with an automatic scanning device 152, an exception processing subsystem 164, a database 180 and a payment/receipt center subsystem 172. The automatic scanning device control 152 may include a package/identification subsystem 154, an unloading surface such as a conveyor belt subsystem 156, a lane light subsystem 158, infrared sensor subsystem 160 and/or a projected consumer guidance subsystem 162. The exception processing subsystem 164 may include a microphone and ear phone headset 166, wireless interface 168 and/or computer access 170. The payment and receipt subsystem 172 may be in communication with a receipt printer, RFID reader, credit card reader, cash drawer 14, scanner scale 176 and/or a touch screen LCD 135*a*.

Most consumers and retailers would prefer the retail checkout process be as quick and accurate as possible. To confirm accuracy, consumers prefer to see that they received the correct prices, discounts due to them and that their vendor coupons were applied correctly to the sale. Concurrently, retailers prefer to be as productive as possible during the checkout process. The speed of a checkout process may also be influenced by the number of items being purchased. For these and other reasons, grocery retailers are most challenged to provide speed, accuracy and productivity within the checkout process.

Currently, the retail checkout process is still highly concentrated around the workload of an attendant at an attended point-of-sale station. Even in the developing hybrid technologies, for example, an automatic scanning device station and/or a pay station, which may exist together or independently of each other. The consumer loads the merchandise they wish to purchase onto a conveyor belt, which conveys the item through the automatic scanning device called a scan tunnel, where it is automatically scanned. An example of a scan tunnel is seen in U.S. patent application Ser. No. 12/283,439 to Zhu as published U.S. Patent Publication 2009/0134221, the Zhu application being incorporated herein in its entirety. Yet another example of a scan tunnel checkout is the Jade Scan Portal offered by Datalogic. The scan tunnel has components straddling the conveyor 133

A check out with an automatic scanning device typically includes an unloading area 132 for the customer to place the items for purchase at a consumer interface. This environment may be more attractive to the consumer than that found in the self-checkouts because it often may appear similar to traditional, attendant-manned checkouts where the items for purchase are place on a conveyor belt and transported to the attendant.

In operation, a customer approaches the unloading area, for example, a roller transport or conveyor belt 133 designed to transport the items A to be purchased, and places the items in the unloading area 132. Unlike traditional checkouts however, the items are not required to be scanned by the customer or the attendant (in most cases). The items are transported on the conveyor from the unloading area 132, through a scan tunnel 134, where the items to be purchased are automatically scanned. Various item recognitions may be taken of each item or particular items as they travel through the scan tunnel. For example, a SKU, bar code, RFID tag, PLU, may be recognized. Additionally, a photo, volumetric representation, or weight measurement may be taken of the item.

The items A to be purchased progress to an item collection area 136 where the attendant may bag the items. Since neither the customer nor the attendant is required to pick up every item for scanning or transaction entry, the transaction speed is increased. The increased transaction speed and reduction of transaction responsibility for the customer is attractive, even for larger transactions. The attendant now has two main functions: 1) bagging items and 2) handling exceptions. These functions will occur rapidly and in higher volume during most transactions than previously experienced by attendants at more traditional checkouts.

In one example, the system may be programmed to only alert the attendant, by way of sound or vibration, that an exception has occurred, and only at a point, when the exception item has reached an exception pick-up area 136. The exception pick-up area is defined generally as the area where an exception item is or is likely to be during the time period beginning when the exception status is notified to the attendant and the ending when the attendant typically picks up the exception item. The exception pick-up area typically will be a place between the scan tunnel and where the attendant is standing or sitting, within ergonomically safe reach of the attendant, and one which does not require the attendant to step either left or right to pick up the item. The exception pick-up area includes the discharge end of the conveyor 133. The exception pick-up area often provides a space within which the attendant can physically separate the exception items from the successfully scanned items in preparation for bagging.

The exception pick-up area may be configurable based on the physical attributes of the logged-in attendant, with attendant's arm's reach often being one factor in establishing the area. For example, each attendant's record in the system may contain measurements corresponding to the employee's arm's length and/or reach. From this measurement, calculated against the belt speed and the location of an exception item on the belt, the system may notify the logged-in attendant appropriately when the exception item can first be reached. For example, even though the scan portal may indicate that a certain item is an exception very early on when it is first scanned on the consumer's side of the portal, the system may wait to notify the attendant at a point when attendant can reach it. In this example, the size of the exception pick-up area may vary depending on the logged-in attendant's ability to reach with ease.

Figure 2:
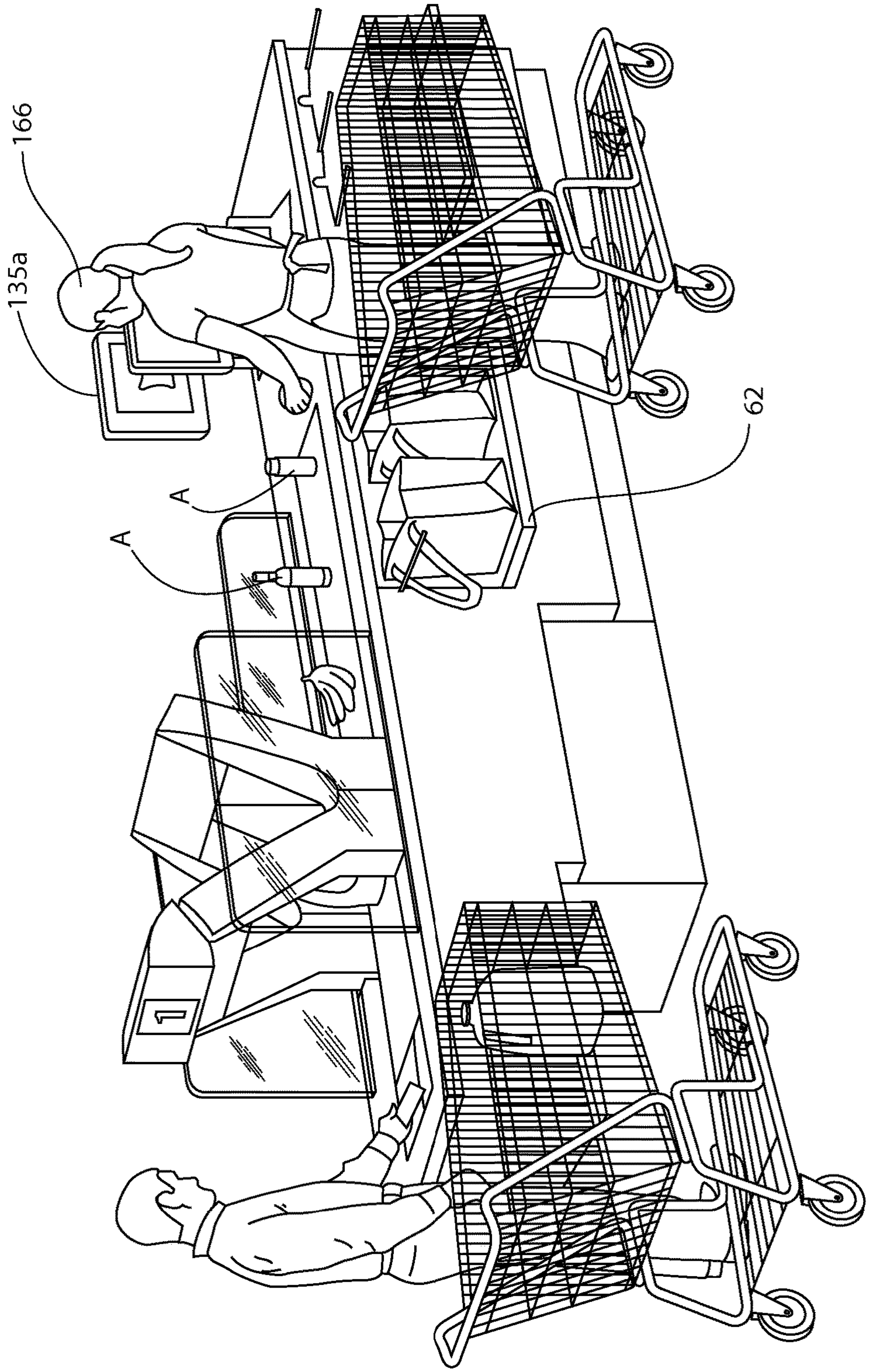
FIG. 2 is a perspective view of the example of FIG. 1 with a customer and an attendant.

A point-of-sale system, as described earlier and shown in FIG. 8, is integrated with 1) the portal scanner and 2) the conveyor belt 133 to enable communications with, and control of, each system. An attendant work station 135, an example as seen in FIG. 2, may include multiple input/output peripherals (touch LCD 20, headset 166, scanner-scale 176, printer, hand held printer, etc.) that allows an attendant to monitor each transaction with the primary function of bagging items and handling exceptions. Exceptions are typically items that are unrecognized by the system and/or that delay a transaction, for example, because bar codes cannot be read, additional clarification is needed, and/or because they do not have bar codes (such as produce and PLU-only items). Other items, such as those requiring age verification are also considered exceptions because they also involve intervention by the attendant and interaction with the system.

At the work station 135, which largely overlaps the exception pick-up area, exception items can be picked up by the attendant, passed over the scanner/scale 176 and deposited into the bag in the bag mount, all with one nearly continuous, ergonomically-suitable attic movement. Several aspects of the checkout counter 11 make this easy motion by the attendant possible. First, the positions of the bag supports may define the cockpit 63 in which the attendant stands. Second, the end of the conveyor is positioned to discharge items A where they can be easily picked up by the attendant, either for direct bagging in the case of scanned items or after scanning in the case of exception items. The exception pick-up area overlaps with this area. Third, the scanner/scale is positioned at an oblique angle to the direction of conveyor movement, so that the particular scanning angle of the scanner/scale is the same as or similar to the direction of the movement of the item A as carried by the attendant in the described aim motion. Fourth, the display 20 is positioned to be easily viewed by the attendant standing in the cockpit 63 and, as it may be hingedly mounted, is adjustable for attendants of various size. The range of attendant sizes taken into consideration is from the smallest 1% of women to the largest 99% of men, essentially a universal size range.

Figure 3A:
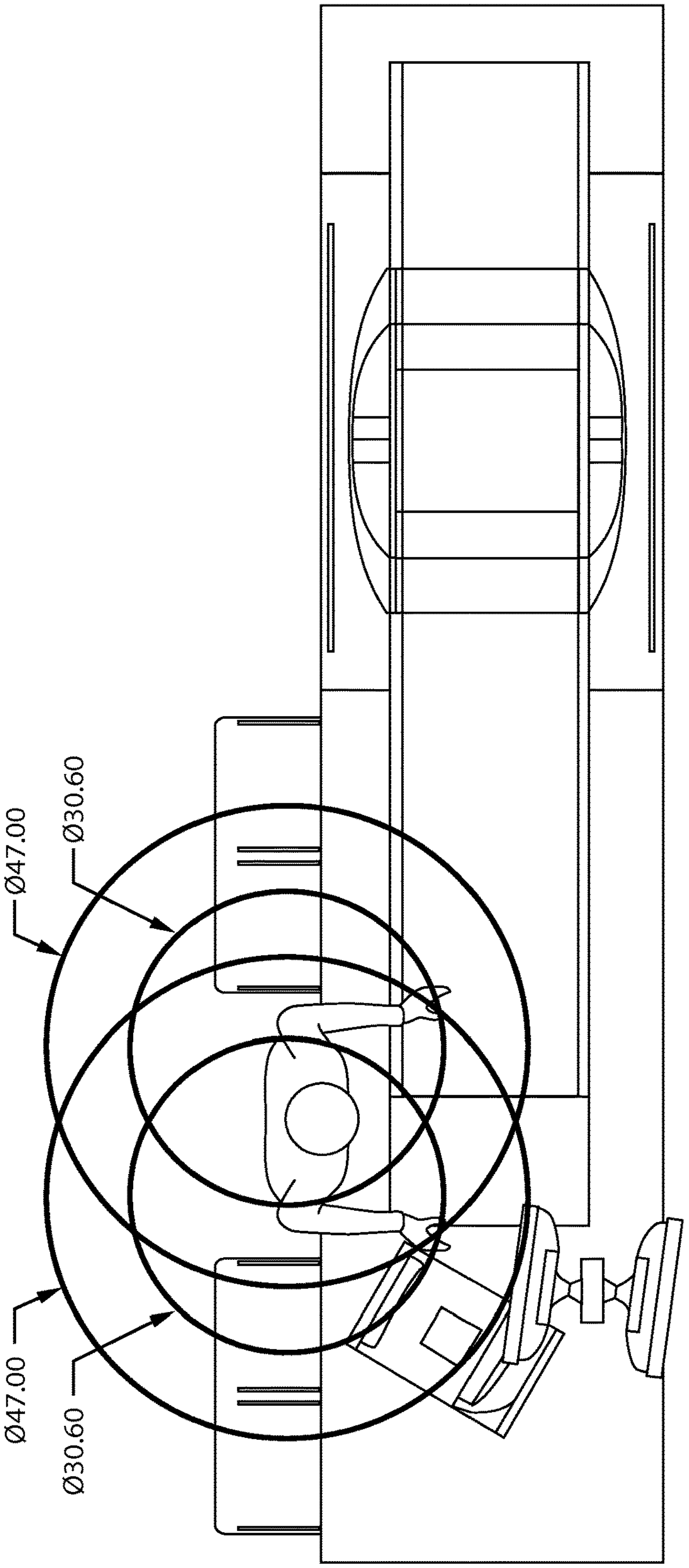
FIG. 3*a* is a top plan view of one example of a checkout including a scan tunnel environment as used by a small female attendant.
Figure 3B:
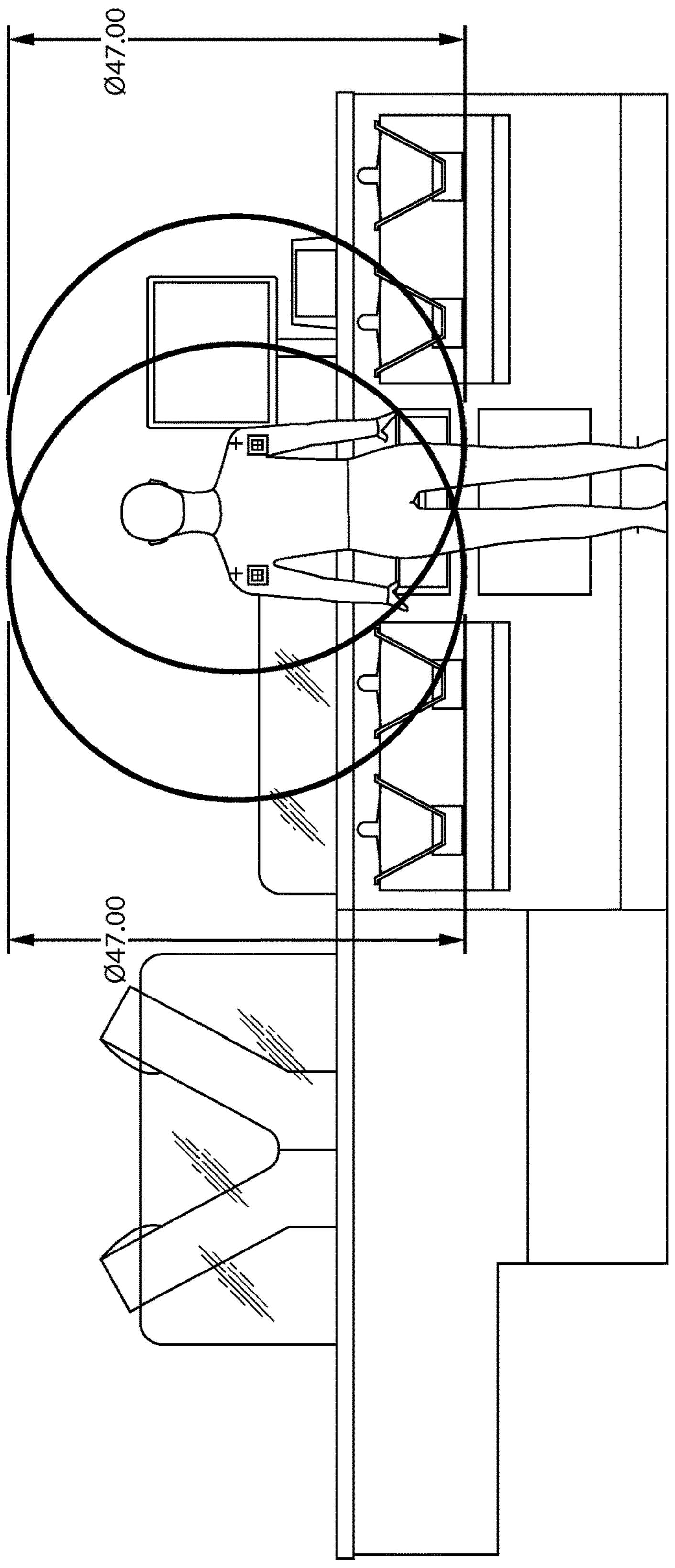
FIG. 3*b* is a side view of the checkout of FIG. 3*a* as used by a small (1st percentile) female attendant.
Figure 4A:
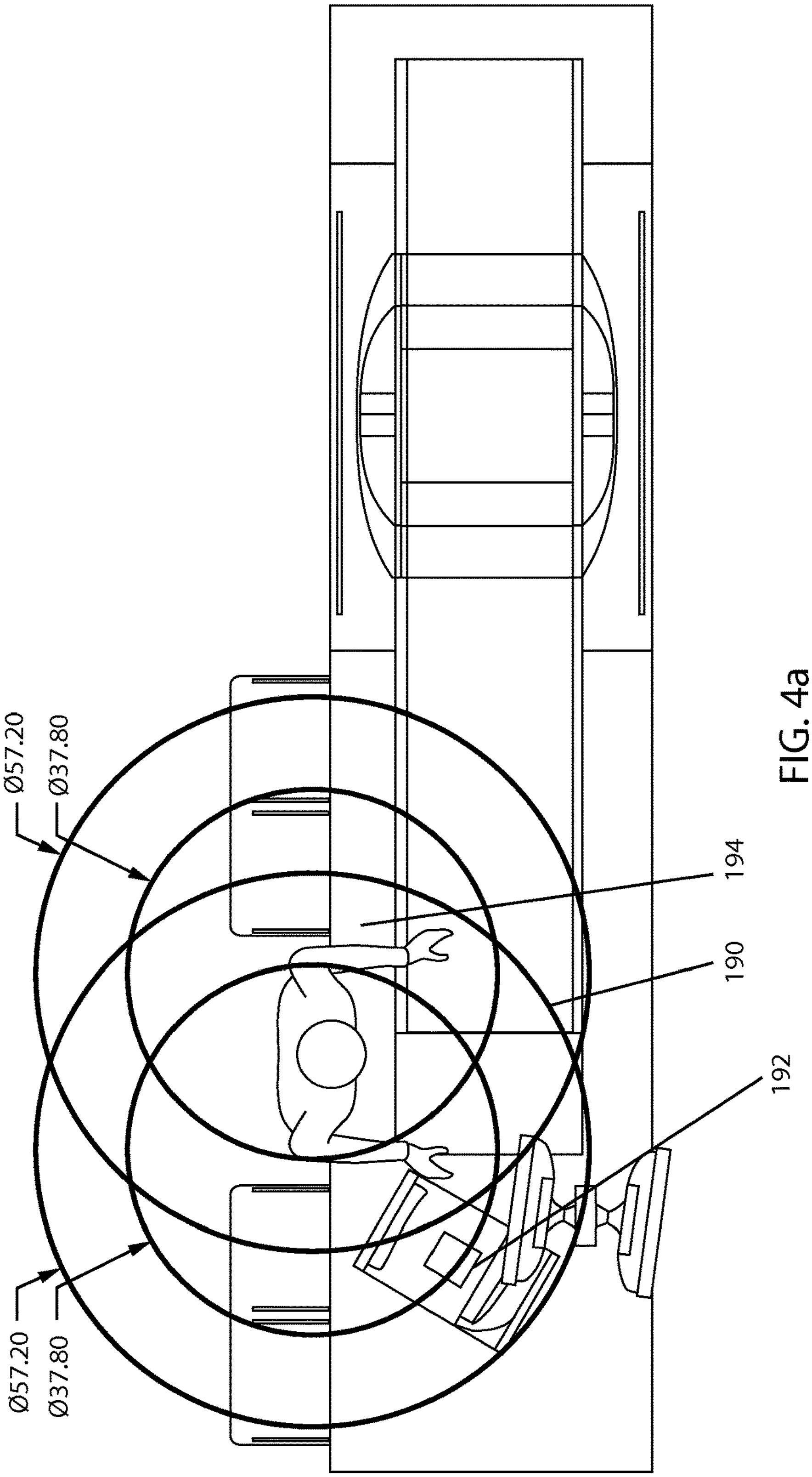
FIG. 4*a* is a top plan view of the checkout of FIG. 3*a* as used by an average-sized (50th percentile) male attendant.
Figure 4B:
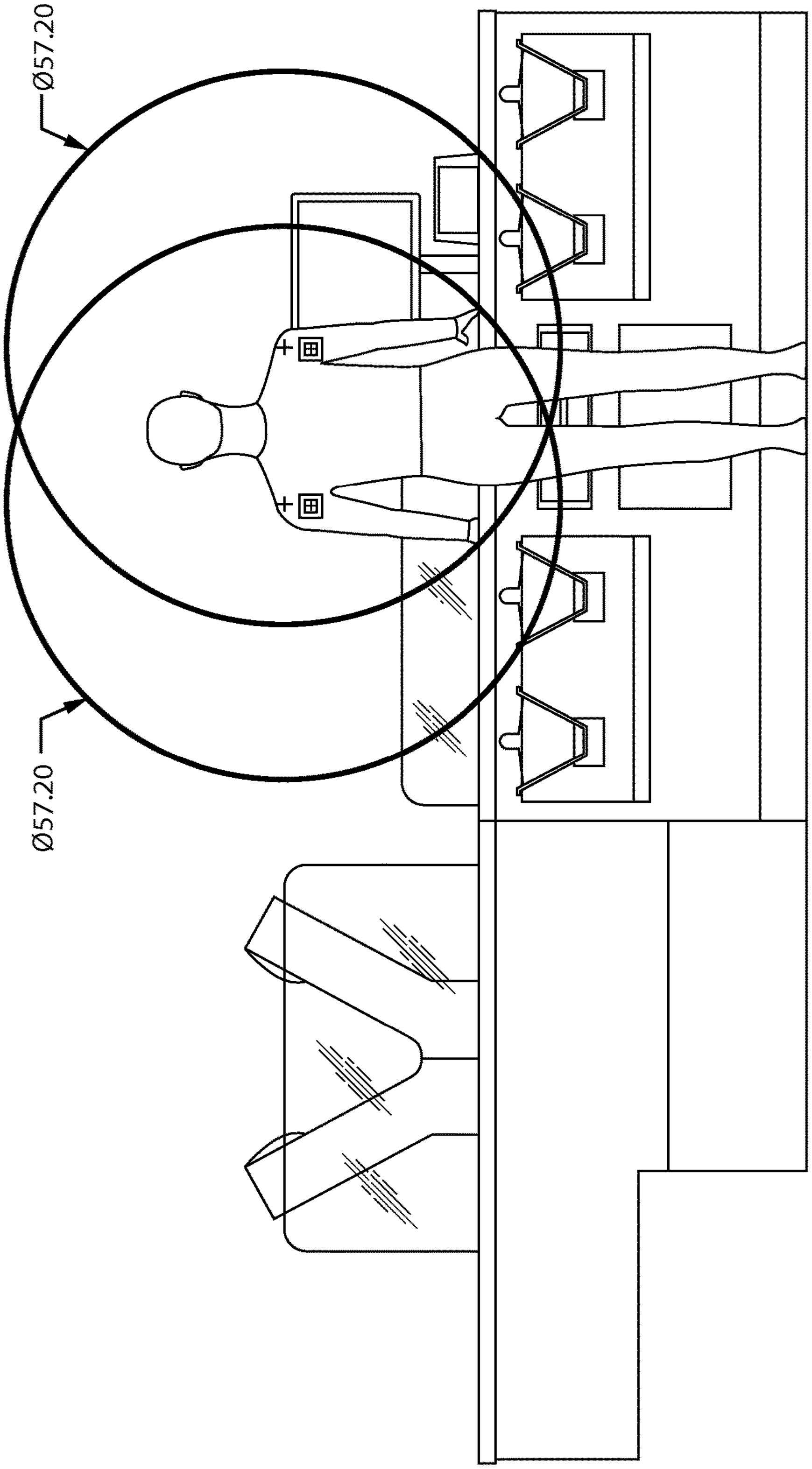
FIG. 4*b* is a side view of the checkout of FIG. 3*a* as used by an average-sized male attendant.
Figure 5A:
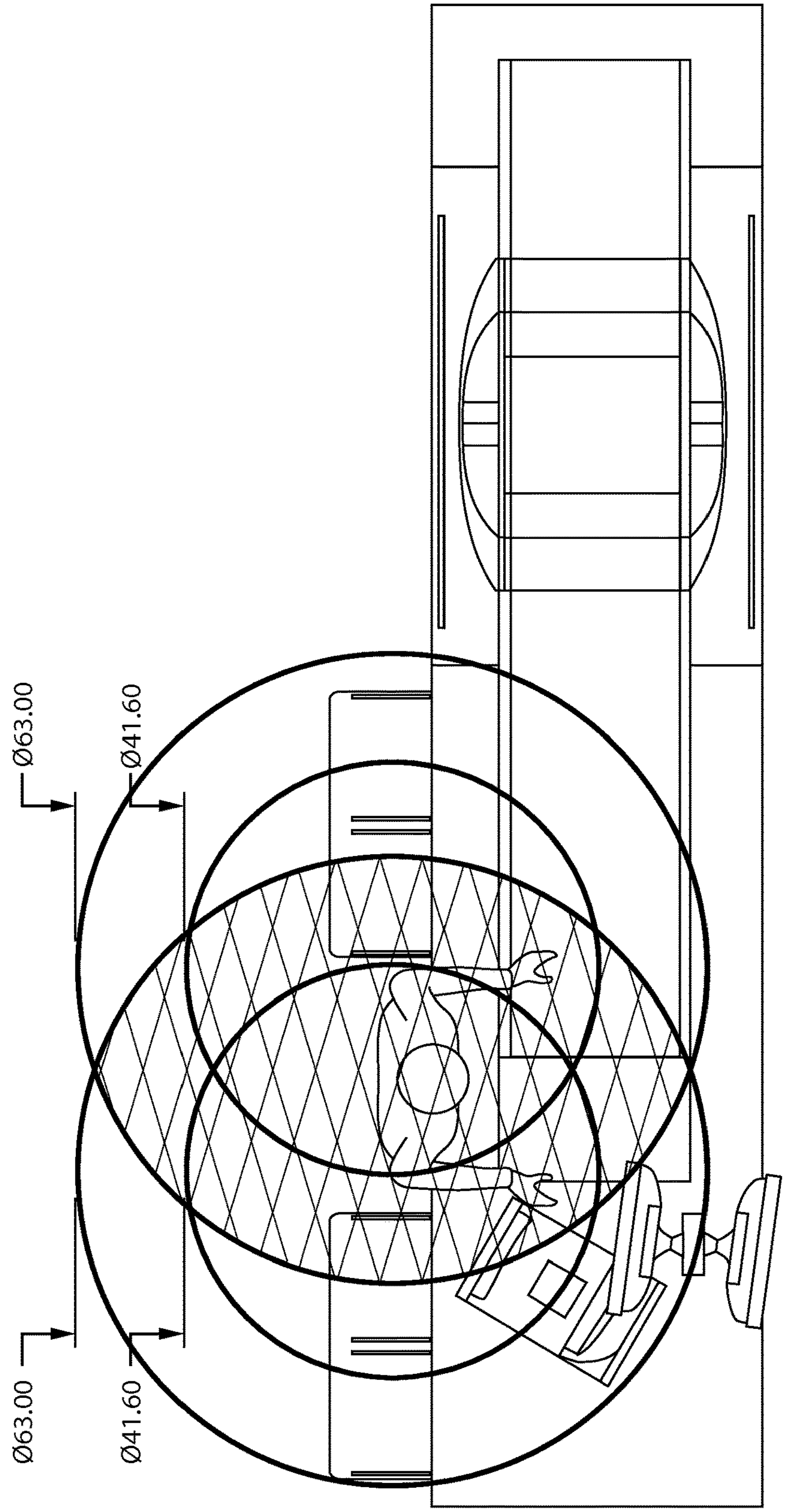
FIG. 5*a* is a top plan view of the checkout of FIG. 3*a* as used by a tall (99th percentile) male attendant.
Figure 5B:
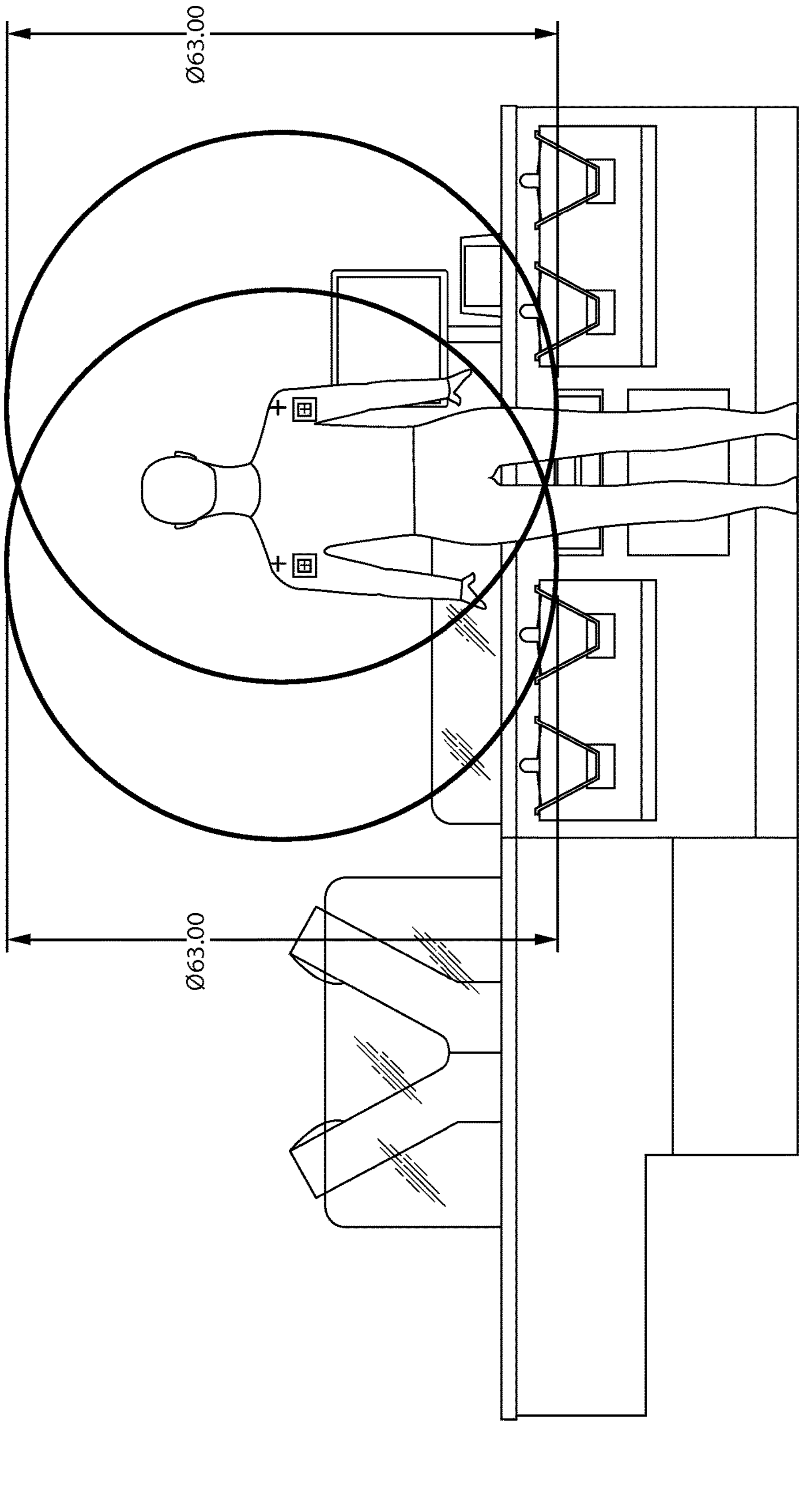
FIG. 5*b* is a side view of the checkout of FIG. 3*a* as used by a tall male attendant.

FIG. 3*a* shows the range of arm motions horizontally for a small female attendant using the checkout, and FIG. 3*b* shows the range of arm motions vertically for a small female attendant using the checkout. FIG. 4*a* shows the range of arm motions horizontally for a medium sized male attendant using the checkout, and FIG. 4*b* shows the range of arm motions vertically for a medium sized male attendant using the checkout. FIG. 5*a* shows the range of arm motions horizontally for a tall attendant using the checkout, and FIG. 5*b* shows the range of aim motions vertically for a tall male attendant using the checkout. As these figures show, the attendant need not take steps with his/her feet or bend to reach to pick up items A, scan them if they are exception items and bag them, regardless of the attendant's stature.

FIG. 4*a* has been annotated to show reach areas for an average sized man, illustrating an attendant reach area 190 shown in cross-hatching in FIG. 4*a* for an attendant standing at the side of the counter at a place in the cockpit 63 called the linear attendant interface zone 194. FIG. 4*a* illustrates the natural range of motion 192 for such an attendant using a right hand.

Figure 6:
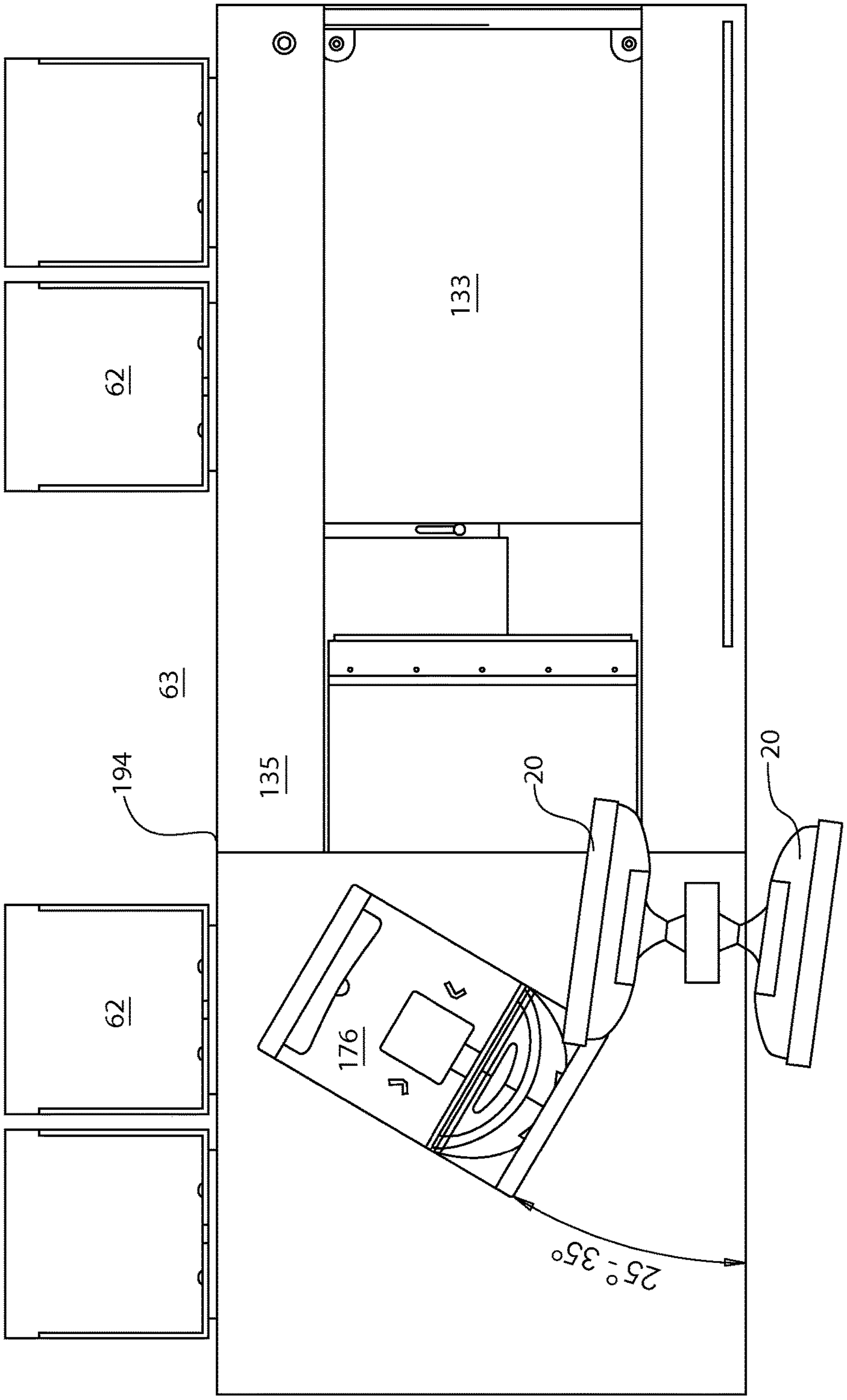
FIG. 6 is a plan view of the checkout, showing illustrative dimensions.

FIG. 6 shows a plan view of the checkout with dimensions (in inches) that enable the attendant to operate in the fashion described. The width of the cockpit 63 between the bag mounts is about 25 inches. The distance from the edge of the cockpit 63 over the conveyor belt to the furthest distance within the exception item pick-up area is about 26 inches; the display 20 is about that far away as well. The distance to the scanner/scale 176 even less, and it is mounted, in the view of FIG. 6 with its particular direction at an angle of thirty degrees to the conveyor transport direction. The distance from the middle of the cockpit 63 to the middle of the furthest bag mount is about 50 inches. These measurements show optimum working distance and the full reach distance without shoulder extension, leaning, or walking. Taking these measurements into consideration, the items that the user needs to work with, such as bagging racks, scanner scale, and panel PC's, are within reach of all sizes of people. Items the attendant may need are centralized to the attendant located in a "cockpit".

While Applicant's disclosure may be directed to increased efficiency and speed when a scan tunnel is integrated into the checkout counter, one skilled in the art will recognize that these improvements may be useful with or without the scan tunnel and as integrated into a traditional attended checkout, a traditional checkout and/or a scan tunnel and pay station environment. System and methods for improved checkout environments are also considered within the scope of the inventions disclosed.

Certain modifications and improvements will occur to those skilled in the art upon a reading of the foregoing description. It should be understood that all such modifications and improvements have been deleted herein for the sake of conciseness and readability but are properly within the scope of the following claim examples.

I claim:

1. A checkout counter comprising: a linear housing having a first customer side for the customer to progress from one end to the other of the linear housing unobstructed, and a second attendant side for the attendant to progress from one end to the other end of the linear housing unobstructed, the housing including: a support surface at a height convenient for a standing person to place and remove items, a powered conveyor to transport placed items in a direction from a first end of the conveyor toward an opposite end, a discharge end at the opposite end, with a span of the support surface extending toward the opposite end beyond the conveyor, an attendant interface having an attendant workstation, a customer interface separated by the powered conveyor from the attendant interface, an alert occurring at the attendant work station identifying any items as error items that were not correctly entered into a transaction listing at a first scanner, an upward-oriented bar code scanner in the support surface to read bar codes of items selected by a customer for purchase that are passed over the bar code scanner by an attendant at the bar code scanner, wherein the bar code reader more reliably reads bar codes of items when scanned in a direction over the bar code reader and the bar code reader is mounted in the support surface with the direction at an oblique angle to the direction that the powered conveyor transports placed items, and a set of bag mounts extending laterally from the support surface to hold open bags for receipt of items placed in the bags by an attendant at the attendant workstation, the bag mounts defining an attendant cockpit located laterally of the checkout counter conveyor adjacent the discharge end for allowing an attendant to stand in the cockpit laterally of the checkout counter and facing the counter at a substantially right angle as the attendant handles items discharged from the conveyor and passes the items over the bar code scanner and places them in a bag held open on a bag mount.

2. A checkout counter as in claim 1 wherein an additional bar code scan tunnel straddles the conveyor between the first end and the discharge end.

3. A checkout counter as in claim 1 wherein the bar code reader more reliably reads bar codes of items when scanned in a particular direction over the bar code reader and the bar code reader is mounted in the support surface with the particular direction at an angle of 20 to 60 degrees to the direction that the powered conveyor transports placed items.

4. A checkout counter as in claim 1 wherein the bar code reader more reliably reads bar codes of items when scanned in a particular direction over the bar code reader and the bar code reader is mounted in the support surface with the particular direction at an angle of 30 to 40 degrees to the direction that the powered conveyor transports placed items.

5. A checkout counter as in claim 1 further comprising a display panel mounted on and spaced above the support surface spaced from the discharge end and across the support surface from the cockpit.

6. A checkout counter as in claim 5 wherein the display panel is mounted on an adjustable hinge, so an attendant may move the display panel as it remains mounted above the support surface.

7. A checkout counter as in claim 1 wherein the cockpit is located adjacent an exception pick-up area associated with the checkout station.

8. A checkout apparatus comprising:

a base having:

- a customer interface,
- a scan tunnel for recording items for purchase into a checkout transaction listing, and
- an attendant interface,
- wherein the customer interface and an attendant work station having the attendant interface are spaced apart from each other linearly by the scan tunnel,
- a transport mechanism extending from the customer interface, through the scan tunnel and to the attendant interface so that a customer may load items for purchase on the base at the customer interface, the transport mechanism transports the loaded items through the scan tunnel to the attendant interface, the scan tunnel equipped with scanners to read information about the loaded items as they pass through the scan tunnel and deliver digital electronic signals indicating the read information to assist in compiling a digital list of items the customer has chosen to purchase to the checkout transaction listing,
- a defined location for the attendant at the attendant work station, and
- a digital attendant identification file including an information about the items for purchase that produced an error and did not ring into the transaction listing, resulting in an error alert occurring at the attendant work station identifying any items that were not correctly entered into the transaction listing, and
- an upward-oriented bar code scanner at the attendant work station to read bar codes of items passed over the bar code scanner by an attendant when the items passing through the scan tunnel resulted in an error reading that disallowed the item from being placed on the checkout transaction listing.

9. A checkout apparatus as according to example 8 wherein the upward-oriented bar code scanner more reliably reads bar codes of items when scanned in a particular direction over the bar code reader and the bar code reader is mounted in the support surface with the particular direction at an oblique angle to the direction that the powered conveyor transports placed items.

10. A method of completing a transaction for attending customers at a checkout counter, comprising:

- providing at an attendant cockpit an adjacent support surface so that an attendant is facing the support surface transversely,
- scanning items for purchase with an automatic scanning device,
- creating a transaction listing for items as they pass through the scanning device so neither a customer or an attendant are required to scan the items for purchase that are correctly entered into the transaction listing, alerting the attendant of any items that had errors and were not correctly entered into the transaction listing when passing through the automatic scanning device, transporting the items in a linear direction from a customer interface to an attendant interface, providing an upward-oriented bar code scanner in the support surface to read bar codes of items not added to a checkout transaction listing when travelling through a scan tunnel, so that the attendant may pass the items over the bar code scanner and enter them into transaction listing, and positioning bag mounts extending laterally from the support surface.

11. A method as in claim 10 wherein scanning takes place with one arm motion without moving from the stance at the cockpit facing the support surface.

12. A method as in claim 10 further comprising looking at a display panel mounted on and spaced above the support surface.

13. A method as in claim 10 wherein the method is performed at a cockpit located at an exception pick-up area associated with the checkout counter.

14. A method as in claim 10 wherein the stance includes standing with feet aligned in a line substantially parallel with the linear direction of the conveyor.

15. An ergonomic checkout stand, comprising:

a linearly arranged checkout housing having a customer interface and a customer unloading station, at least one conveyor belt extending in a linear plane from the customer interface to a linear arranged attendant interface zone, the linearly arranged checkout housing configured to have a first customer side for the customer to progress from one end to the other of the linear housing unobstructed, and a second attendant side for the attendant to progress from one end to the other end of the linear housing unobstructed, an automatic scanning device, wherein the automatic scanning device scans into a transaction listing items for purchase as they pass through the scanning device so neither a customer or an attendant are required to scan the items for purchase that are correctly entered into the transaction listing, a point-of-sale system having a microprocessor and memory operatively associated with one another to identify products being purchased, payments tendered therefor and to store transaction information locally at the checkout station or remotely from the checkout station, an attendant work station including the attendant interface zone, an exception alert occurring at the attendant work station identifying any items as exceptions that were not correctly entered into the transaction listing, and an attendant reach area at the attendant interface zone, the attendant reach area being spaced apart from the customer interface by the scanning device, and the attendant reach area being a variable affecting a timing of the exception alert, wherein the attendant reach area includes a secondary scanning device, upwardly-oriented and non-perpendicularly set to the attendant interface zone creating a non-linear scanning path for items being scanned by the attendant that were identified through an exception alert.

16. The checkout of claim 15 including a bagging station within a portion of the attendant reach area.

17. The checkout of claim 16 including a second bagging station within an opposite portion of the attendant reach area.

18. The checkout of claim 17 where the scanning device is set at an angle on the checkout stand within an average attendant reach area.

19. The checkout of claim 17 wherein an average attendant reach area is about 38 inches.

20. The checkout of claim 18 wherein the bagging station and the scanning device are arranged within an average reach area so that the scanning of items at the attendant reach area is allowed to proceed in a natural range of motion for the attendant.

21. The checkout of claim 20 wherein the natural range of motion includes a non-linear scan path as to the checkout housing.

22. The checkout stand of claim 20 wherein the natural range of motion includes an arc motion for the scanning and bagging of items.

23. The checkout stand of claim 20 wherein the arc motion is a singular motion.

24. The checkout stand of claim 20 including a scan portal between the customer unloading station and the attendant reach area.

* * * * *

UNITED STATES PATENT AND TRADEMARK OFFICE

CERTIFICATE OF CORRECTION

PATENT NO. : 10,210,361 B1
APPLICATION NO. : 14/835145
DATED : February 19, 2019
INVENTOR(S) : Peter Catoe It is certified that error appears in the above-identified patent and that said Letters Patent is hereby corrected as shown below:

In the Claims

In Column 10, Line 50, --example 8-- should be "Claim 8"

In Column 10, Line 57, the word "attending" should be deleted

Signed and Sealed this
Twenty-seventh Day of August, 2019

Andrei Iancu
*Director of the United States Patent and Trademark Office*